United States Patent [19]
Nankaku

[11] Patent Number: 4,939,664
[45] Date of Patent: Jul. 3, 1990

[54] NUMERICAL CONTROL APPARATUS AND METHOD FOR PREPARING MACHINING DATA FOR CUTTING AN AREA WHICH IS NARROW IN THE MIDDLE

[75] Inventor: Shigeki Nankaku, Aichi, Japan

[73] Assignee: Mitsubishi Denki Kabushiki Kaisha, Tokyo, Japan

[21] Appl. No.: 211,513

[22] Filed: Jun. 24, 1988

[30] Foreign Application Priority Data

Jun. 26, 1987 [JP] Japan ................................. 62-157825

[51] Int. Cl.$^5$ ........................................... G05B 19/403
[52] U.S. Cl. ............................ 364/474.29; 364/474.18; 318/572
[58] Field of Search ....................... 364/474.29, 474.01, 364/474.18, 474.28, 474.35; 318/572, 568, 569, 571, 568.1

[56] References Cited

U.S. PATENT DOCUMENTS

| 4,706,200 | 11/1987 | Kishi et al. | 364/474.29 |
| 4,706,201 | 11/1987 | Kishi et al. | 364/474.29 |
| 4,739,489 | 4/1988 | Kishi et al. | 364/474.29 X |
| 4,745,558 | 5/1988 | Kishi et al. | 364/474.29 |
| 4,791,576 | 12/1988 | Tanaka et al. | 364/474.29 |

Primary Examiner—Joseph Ruggiero
Attorney, Agent, or Firm—Sughrue, Mion, Zinn, Macpeak & Seas

[57] ABSTRACT

A numerical control apparatus having a function of cutting the interior of an area bounded by a closed curve in a workpiece and a method for preparing a machining program for the area cutting. The numerical control apparatus is capable of machining a workpiece completely as required, even if tool paths have an intersection or intersections with themselves.

2 Claims, 6 Drawing Sheets

NUMERICAL CONTROL APPARATUS AND METHOD FOR PREPARING MACHINING DATA FOR CUTTING AN AREA WHICH IS NARROW IN THE MIDDLE

BACKGROUND OF THE INVENTION

The present invention relates to a numerical control apparatus having a function of cutting the interior of an area bounded by a closed curve in a workpiece. More particularly, the invention relates to a numerical control apparatus capable of machining an area from inside which is so narrow in the middle that the locus of the center of the tool (hereinafter referred to as "a tool path", when applicable) intersects itself, and to method for preparing machining data for the area cutting operation.

Formerly, EIA codes or the like were mainly used to input machining program. However, recently, the locus of the center of a machining tool (tool path) is formed based on data on such a final configuration 8 as shown in Fig. 1(a) and other data for instance on a tool diameter. That is, the numerical control apparatus has a so-called offset function that is to calculate and obtain a tool path pattern or offset configuration according to the input configuration 8.

In FIG. 1(a), a machining tool such as an end mill or face mill is used to machine a workpiece 10 to cut the interior of an area 11 bounded by a closed curve 8 (final configuration) in the workpiece. In this case, as shown in FIG. 1(b), several tool paths 9a, 9b, 9c and 9d are determined from the final configuration 8 before the machining operation is started. Since the machining operation is carried out along the tool paths 9a to 9d in this order, the heaviest load is applied to the machining tool in the cutting along the path 9a and the machining speed is thus made relatively lower. During the second to fourth cutting, the machining speed is set to a speed higher than the first cutting speed. The tool path 9a is determined to have an offset value equal to a radius r of the machining tool, and the tool paths 9b and 9c are respectively determined to have an offset value in a range from (2r ×0.6) to (2r ×0.7) from the preceding tool path. The machining along 9d is carried out to remove an uncut portion due to abrasion of the machining tool.

In the case where, as shown in FIG. 6, an area 11 to be formed is narrow in the middle, the second tool path 9b will intersect itself. In this case, the workpiece cannot be machined with the conventional numerical control apparatus; that is, it is handled as an erroneously selected workpiece, or a method is employed in which the machining region is divided into a plurality of closed areas so that the tool path may not cross itself, and for each of the closed areas tool paths are determined. In other words, the machining programs are prepared for each of the closed areas. The former case suffers from a difficulty that it is impossible to machine the workpiece completely as required; that is, the region to be machined is not completely machined. The latter case is disadvantageous in that the number of machining steps is increased; that is, a step of dividing the closed area into a plurality of parts, and a step of determining tool paths for each of the parts thus provided are added.

SUMMARY OF THE INVENTION

Accordingly, in view of the above, an object of this invention is to eliminate the above-described difficulties accompanying a conventional numerical control apparatus. More specifically, an object of the invention is to provide a numerical control apparatus capable of machining a workpiece completely as required, with parts to be machined being machined, even though the tool paths or offset configuration have intersections.

The above and other object of the present invention has been achieved by the provision of a numerical control apparatus which, according to the invention, in machining a closed area from inside, comprises: means for detecting the direction of rotation of a final configuration; means for forming a tool path of the final configuration; means for dividing, when the tool path has an intersection, an area defined by the tool path into a plurality of closed regions; means for searching, when the tool path has no intersection, all closed regions for abnormal tags; means for disregarding, when a closed region includes an abnormal tag, the closed region as being invalid, and searching the following closed region; means for determining, when a closed region includes no abnormal tag, whether or not the direction of rotation of the closed region is the same as the direction of rotation of the final configuration; means for outputting, when the direction of rotation of the closed region is the same as the direction of rotation of the final configuration, the closed region as being valid; and means for disregarding, when the direction of rotation of the closed region configuration, the closed region and searching the following closed region.

BRIEF DESCRIPTION OF THE DRAWINGS

In the accompanying drawings.

In these figures, same parts are designated by the same or corresponding reference numerals or characters, respectively.

DESCRIPTION OF THE PREFERRED EMBODIMENT

An embodiment of the present invention will be described with reference to the accompanying drawings.

Figure 1A:
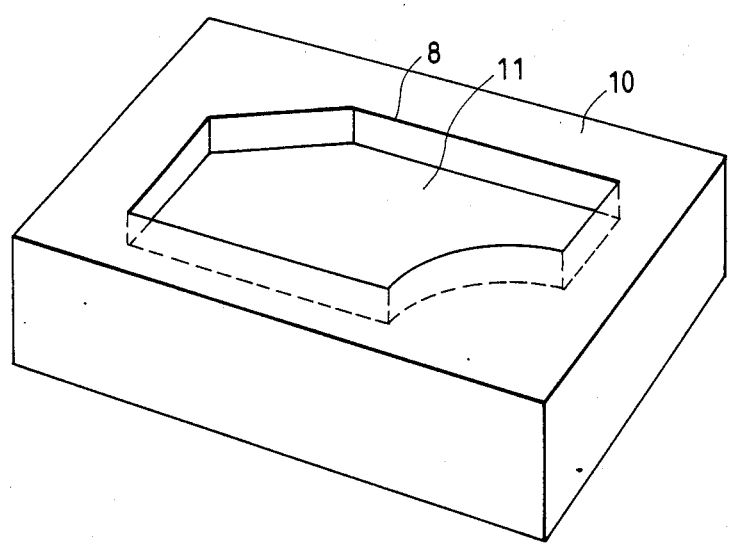
FIG. 1 (a) is a diagram illustrating a perspective view of a workpiece and FIG. 1(b) is a top view showing a tool path in the workpiece.
Figure 1B:
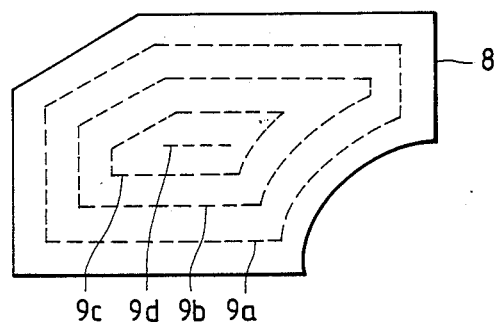
Figure 2:
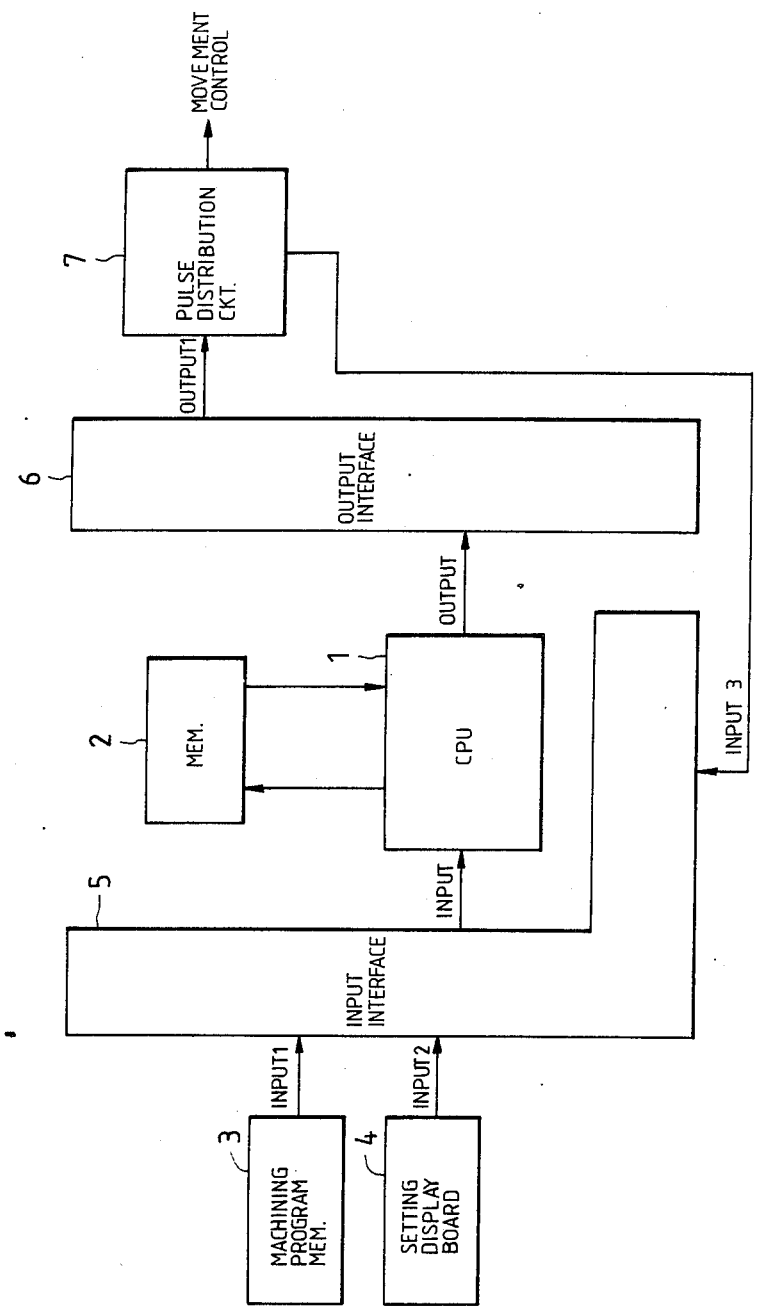
FIG. 2 is a block diagram showing an embodiment of a numerical control apparatus according to the present invention.

FIG. 2 is a block diagram showing an embodiment of a numerical control apparatus according to the present invention. In FIG. 2, reference numeral 1 designates a CPU (control processing unit); 2, a memory in which a control program is stored; 3, a memory in which a machining program is stored; 4, a setting display board; 5, an input interface; 6, an output interface; and 7, a pulse distribution circuit.

The operation of the numerical control apparatus thus organized will be described.

The CPU 1 executes the control program stored in the memory 2, one instruction at a time. More specifically, according to the control program, the CPU reads input data from the machining program memory 3 and the setting display board 4 through the input interface 5 to perform the necessary processing operations, and applies movement data through the output interface 6 to the pulse distribution circuit 7. As a result, the pulse distribution circuit 7 outputs pulses to control the movement of the machine tool.

Figure 3:
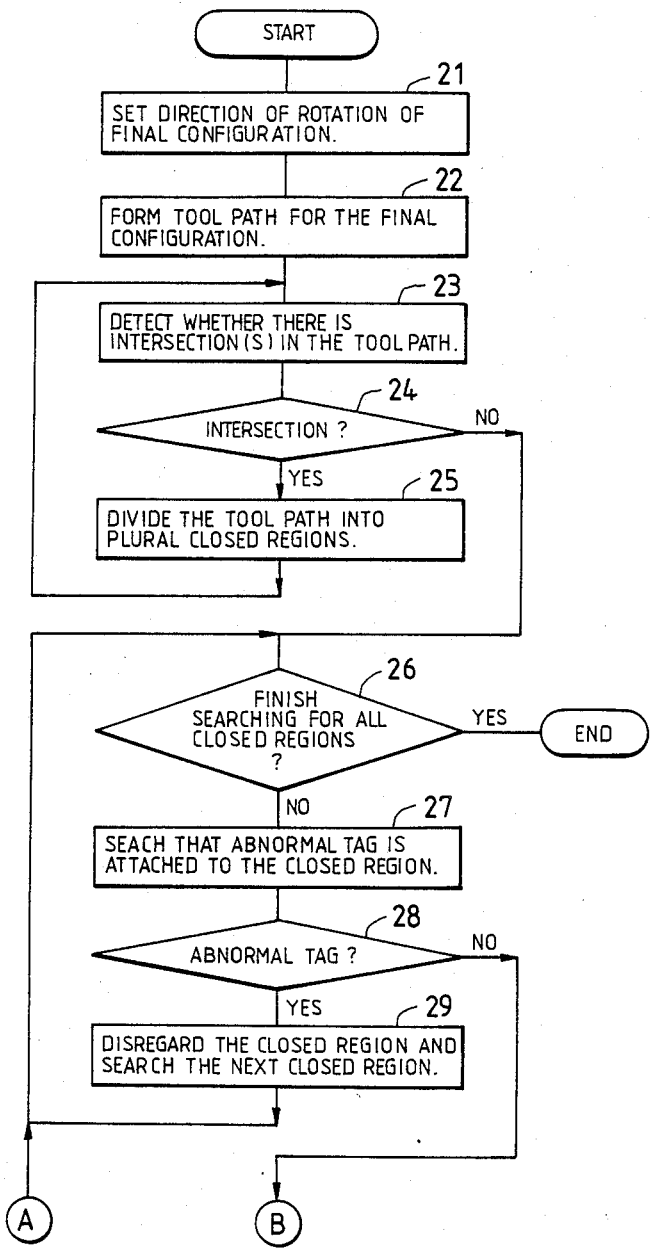
FIGS. 3 and 4 are flow charts showing a machining program in an embodiment of the present invention.
Figure 4:
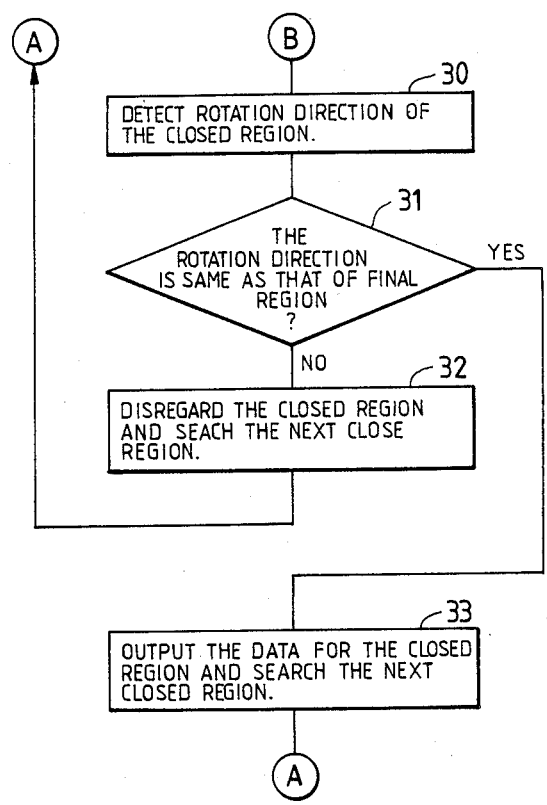
Figure 5A:
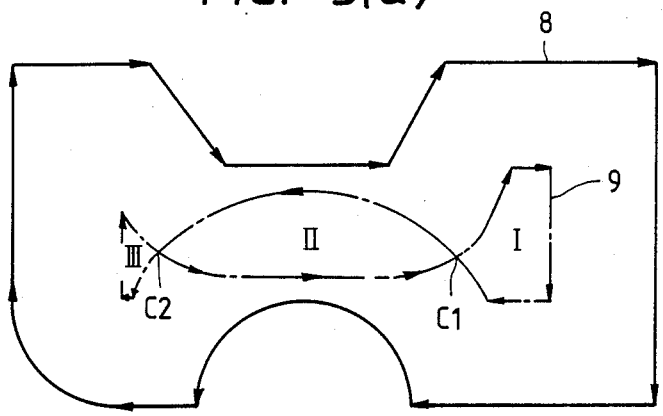
FIGS. 5 (a), 5(b) and 6 are explanatory diagrams showing one example of a method of machining a closed area which is narrow in the middle, according to the present invention.
Figure 5B:
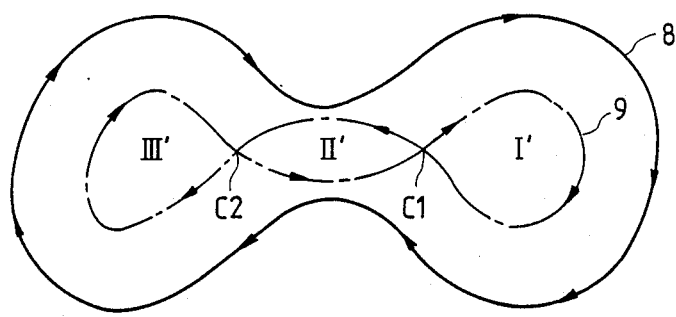
Figure 6:
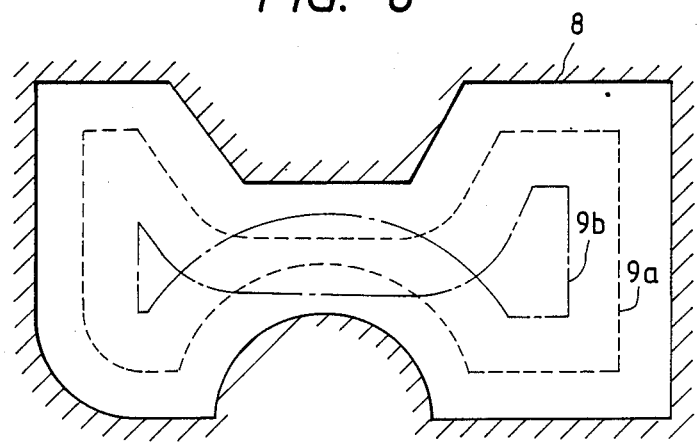

FIGS. 3 and 4 are flow charts showing a machining program in the embodiment of the invention, for a description of a method of machining the interior of an area bounded by a closed curve which is narrow in the middle thereof as shown in FIGS. 5 and 6

It is assumed that, in FIGS. 5 and 6, a final configuration 8 is formed by machining the workpiece in the direction of the arrows, that is in a clockwise direction. Therefore, in step 21 in FIG. 3, the direction of rotation of the final configuration 8 is obtained as an input configuration. This can be readily obtained if the workpiece machining direction is determined as described above.

In step 22, a tool path 9 is formed for the input configuration 8. In step 23, it is detected whether or not the tool path 9 thus formed has an intersection or intersections.

If, in step 24, it is determined that the tool path 9 has intersections, then in step 25 the area defined by the tool path 9 is divided into closed regions. When, for instance in FIG. 5, the intersection C1 is detected, a closed region I is separated from the area. Under this condition, the step 23 is effected again to determine Whether or not the closed region I has intersections, and the same operation is carried out. In the case of FIG. 5, the closed region I has no other intersection, and therefore the closed region I is one closed region.

Figure 7:
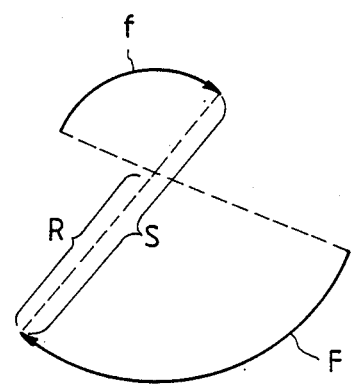
FIGS. 7 and 8 are explanatory diagrams for a description of "an abnormal tag".
Figure 8:
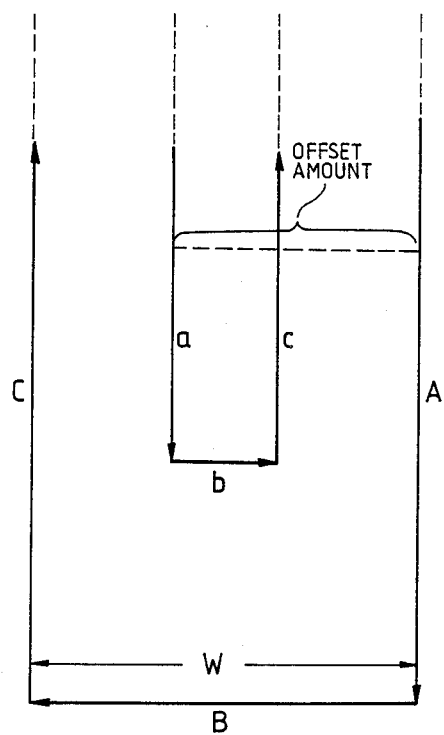

When no intersection is found, step 26 is effected to determine whether or not all the closed regions I, II and III have been searched for intersections. That is, in step 27, it is determined whether or not "an abnormal tag" is attached to the configuration element of the closed region I. The term "abnormal tag" as used herein is intended to mean the tag which is attached to the configuration element in the case where, as shown in Fig. 7, an amount of offset S with respect an original configuration (for instance a circle) F is larger than the radius R of the circle, and therefore the offset configuration f is reversed with to the original configuration, or in the case where, as shown in FIG. 8, the direction of movement of an offset configuration b with respect to a line B is different from that of movement of the original configuration. This is because the width W of a portion to be cut, which is shown in Fig. 8, is smaller than the diameter $2r$ of the machining tool.

In step 28, it is determined whether or not the closed region has such an abnormal tag. If the closed area includes the abnormal tag, then in step 29 the closed region, being invalid, is disregarded, and the step 26 is effected again to search the next closed region for intersections. As is apparent from FIGS. 5(a) and 5(b), the closed region I or I' includes no such abnormal tags. Therefore, step 30 (FIG. 4) is effected to detect the direction of rotation of the closed region I or I'. And in step 31, it is determined whether or not the direction of rotation of the closed region I or I' that is, that of the tool path is the same as the direction of rotation of the input configuration. If the former is not the same as the latter, then in step 32 the next closed region is searched.

And the above-described step 26 is effected again so that the region is processed in the same manner. As is apparent from FIGS. 5(a) and 5(b), the direction of rotation of the closed region I or I' is equal to the direction of rotation of the input configuration. Therefore, in step 33, the configuration of the closed region I or I' is outputted, and the next closed region is searched.

The next closed region II or II has no abnormal tag; however, the direction of rotation of the closed region II or II', being counterclockwise, is different from the direction of the rotation of the input configuration. Therefore, the closed region II or II' is determined invalid. Similarly as in the closed region I or I', the closed region III or III' is valid.

Thus, in this case, the configurations of the closed regions I or I' and III or III' are outputted as being valid.

In the numerical control apparatus according to the invention, it is determined whether or not the tool path formed according to the final configuration has an intersection. If the tool path has an intersection, it means that the final configuration is narrow in the middle, and therefore the area defined by the tool path is divided into a plurality of closed regions. When the tool path has no intersection, all closed regions are searched for an abnormal tag. A closed region including an abnormal tag is disregarded as being invalid. When it is determined that a closed region has no abnormal tag, it is determined whether or not the direction of rotation of the closed region is the same as the direction of rotation of the final configuration. When the direction of rotation of the closed region is the same as the direction of rotation of the final configuration, the closed region is outputted as being valid. When the direction of rotation of the closed region is not the same as the direction of rotation of the final configuration, the closed region is disregarded as being invalid, and the following closed region is searched. Thus, even a closed area which is narrow in the middle can be readily machined with the numerical control apparatus of the invention.

As is apparent from the above description, even in the case where an area bounded by a closed curve to be formed in a workpiece is narrow in the middle, the workpiece can be readily machined as required, without leaving parts which are not machined. In this operation, it is unnecessary to again determine tool paths.

What is claimed is:

1. A numerical control apparatus capable of machining the interior of an area bounded by a closed curve, comprising:
   means for setting the direction of rotation of data representing a final configuration of the area;
   means for forming a tool path for the final configuration;
   means for determining whether or not the tool path has an intersection with itself;
   means for dividing, when the tool path has an intersection, the area defined by the tool path into a plurality of closed regions;
   means for searching, when said tool path has no intersection, all closed regions for abnormal tags;
   means for disregarding, when the closed region includes an abnormal tag, the closed region as being invalid, and searching a next closed region;
   means for determining, when a closed region includes no abnormal tag, whether or not the rotation direction of the closed region is the same as the rotation direction set by said setting means;

means for outputting, when the direction of rotation of the closed region is the same as the rotation direction set by said setting means, the closed region as being valid; and means for disregarding, when the direction of rotation of the closed region is not the same as the rotation direction set by said setting means, said closed region and searching said next closed region.

2. A method for preparing a machining program for cutting an area bounded by a closed curve, comprising the steps of:

setting the direction of rotation of data representing a final configuration of the area;

forming a tool path for the final configuration;

determining whether or not the tool path has an intersection with itself;

dividing, when the tool path has an intersection, the area defined by the tool path into a plurality of closed regions;

searching, when said tool path has no intersection, all closed regions for abnormal tags;

disregarding, when the closed region includes an abnormal tag, the closed region as being invalid, and searching a next closed region;

determining, when a closed region includes no abnormal tag, whether or not the rotation direction of the closed region is the same as the rotation direction of data representing the final configuration;

outputting, when the direction of rotation of the closed region is the same as the rotation direction of the data representating the final configuration, the closed region as being valid; and disregarding said closed region when the direction of rotation of the closed region is not the same as the rotation direction of the data representing the final configuration, and searching said next closed region.

* * * * *